US009635706B1

(12) United States Patent
Bonawitz

(10) Patent No.: US 9,635,706 B1
(45) Date of Patent: Apr. 25, 2017

(54) METHOD FOR DETERMINING FLEET CONTROL POLICIES TO SATISFY A SEQUENCE OF COVERAGE REQUIREMENTS

(71) Applicant: X Development LLC, Mountain View, CA (US)

(72) Inventor: Keith Allen Bonawitz, Berkeley, CA (US)

(73) Assignee: X Development LLC, Mountain View, CA (US)

( * ) Notice: Subject to any disclaimer, the term of this patent is extended or adjusted under 35 U.S.C. 154(b) by 692 days.

(21) Appl. No.: 13/732,546

(22) Filed: Jan. 2, 2013

(51) Int. Cl.
*G06F 19/00* (2011.01)
*G06G 7/70* (2006.01)
*G06G 7/76* (2006.01)
*G06G 1/00* (2006.01)
*H04W 84/18* (2009.01)
*G01C 21/00* (2006.01)

(52) U.S. Cl.
CPC .................................. *H04W 84/18* (2013.01)

(58) Field of Classification Search
CPC ..................................................... H04W 84/18
USPC ................. 701/117, 200; 705/7.12; 340/902; 455/431
See application file for complete search history.

(56) References Cited

U.S. PATENT DOCUMENTS 6,167,263 A * 12/2000 Campbell .................... 455/431
6,324,398 B1 11/2001 Lanzerotti et al.
6,402,090 B1 6/2002 Aaron
6,437,743 B1 8/2002 Mintz et al.
6,507,739 B1 1/2003 Gross et al.
6,611,755 B1 8/2003 Coffee et al.
6,628,941 B2 9/2003 Knoblach et al.
(Continued)

FOREIGN PATENT DOCUMENTS

FR 2972697 9/2012

OTHER PUBLICATIONS

"Fleet management with automatic vehicle location", by Harden, M.D., published May 20-22, 1986 (Motorola Inc., Mobile Products Division).
(Continued)

*Primary Examiner* — Jelani Smith
*Assistant Examiner* — Mahmoud Ismail
(74) *Attorney, Agent, or Firm* — McDonnell Boehnen Hulbert & Berghoff LLP

(57) ABSTRACT

Methods and systems for determining control policies for a fleet of vehicles are provided. In one example, a method is provided that comprises receiving a sequence of coverage requirements for a region and an associated period of time, and receiving an initial location of one or more vehicles of a fleet of vehicles. The method may further include determining a control policy for each of the one or more vehicles. Additionally, based on the determined control policies and the initial locations, one or more estimated distributions of the fleet of vehicles at respective phases within the period of time may be determined. According to the method, a score associated with the control policies may be determined based on a comparison between the estimated distributions and corresponding desired distributions of the sequence of coverage requirements. In some examples, the control policies may also be revised using an optimization technique.

18 Claims, 9 Drawing Sheets

(56) References Cited

U.S. PATENT DOCUMENTS

| | | |
|---|---|---|
| 6,678,520 B1 | 1/2004 | Wang |
| 7,046,934 B2 | 5/2006 | Badesha et al. |
| 7,356,390 B2 | 4/2008 | Knoblach et al. |
| 7,469,857 B2 | 12/2008 | Voss |
| 7,512,462 B2 | 3/2009 | Nichols et al. |
| 7,844,218 B2 | 11/2010 | Seligsohn et al. |
| 7,946,533 B2 | 5/2011 | Goodzeit |
| 8,116,763 B1 | 2/2012 | Olsen |
| 8,238,903 B2 | 8/2012 | Korbet |
| 8,260,485 B1 | 9/2012 | Meuth et al. |
| 8,275,499 B2 | 9/2012 | Coulmeau et al. |
| 2002/0077944 A1 | 6/2002 | Bly et al. |
| 2003/0040273 A1 | 2/2003 | Seligsohn et al. |
| 2006/0167599 A1 | 7/2006 | Boden et al. |
| 2007/0288132 A1 | 12/2007 | Lam |
| 2008/0144884 A1 | 6/2008 | Habibi |
| 2009/0267740 A1 | 10/2009 | Pizzuto |
| 2010/0010732 A1* | 1/2010 | Hartman .................. 701/200 |
| 2011/0109475 A1* | 5/2011 | Basnayake et al. .......... 340/902 |
| 2011/0147513 A1 | 6/2011 | Surmont |
| 2012/0073682 A1 | 3/2012 | Geneste |
| 2012/0215505 A1 | 8/2012 | Srivastav et al. |
| 2012/0256770 A1 | 10/2012 | Mitchell |
| 2013/0226637 A1* | 8/2013 | Bozchalui et al. .......... 705/7.12 |

OTHER PUBLICATIONS

"A Mobile Location-Based Vehicle Fleet Management Service Application", by Silva, A.P., published Jun. 9-11, 2003, IEEE.

A method for Balloon Trajectory Control, by Aaron, K.M. et al., Global Aerospace Corporation, published Jun. 21, 2008.

Path Planning for Autonomous Underwater Vehicles in Realistic Oceanic Current Fields: Application to Gliders in the Western Mediterranean Sea, by Garau B. et al., Journal of Maritime Research, vol. VI. No. II, pp. 5-22, 2009.

Real-time Trajectory Design for Unmanned Aerial Vehicles using Receding Horizon Control, by Yoshiaki Kuwata, Thesis submitted to the MIT Department of Aeronautics and Astronautics, Jun. 2003.

Swarm Intelligence in autonomous collective robotics: from tools to the analysis and synthesis of distributed control strategies, Alcherio Martinoli, Thesis, 1999.

Autonomous Underwater Vehicle Path Planning: A Comparison of A* and Fast Marching Method, Kevin DeMarco, available at http://www.kevindemarco.com/wp-content/uploads/2011/05/fmm_paper_revised.pdf, 2011.

Optimal AUV path planning for extended missions in complex, fast-flowing estuarine environments, Dov Kruger et al., 2007 IEEE Conference on Robotics and Automation, Apr. 2007.

* cited by examiner

METHOD FOR DETERMINING FLEET CONTROL POLICIES TO SATISFY A SEQUENCE OF COVERAGE REQUIREMENTS

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one example, a method is provided that comprises receiving a sequence of coverage requirements for a region and an associated period of time, and receiving an initial location of one or more vehicles of a fleet of vehicles. The region may be divided into a plurality of cells, and an individual coverage requirement may indicate a desired distribution of vehicles among the plurality of cells at a given phase within the period of time. The method may further include determining, by a processor, a control policy for each of the one or more vehicles for the period of time. An individual control policy for a vehicle may comprise information indicative of a direction of travel for the vehicle for respective cells of the plurality of cells. The method may also include, based on the control policies and the initial locations of the one or more vehicles, determining, by the processor, one or more estimated distribution of vehicles in the fleet of vehicles at respective phases within the period of time. According to the method, the processor may also determine a score associated with the determined control policies based on a comparison between the one or more estimated distributions and corresponding desired distributions of the sequence of coverage requirements.

In another example, a computer-readable storage medium having stored therein instructions, that when executed by a computing device, cause the computing device to perform functions is provided. The functions comprise receiving a sequence of coverage requirements for a region and an associated period of time. The region may be divided into a plurality of cells, and an individual coverage requirement may indicate a desired distribution of vehicles among the plurality of cells at a given phase within the period of time. The functions also comprise receiving an initial location of one or more vehicles of a fleet of vehicles, and determining a control policy for each of the one or more vehicles for the period of time. An individual control policy may comprise information indicative of a direction of travel for a vehicle for respective cells of the plurality of cells. The functions further comprise determining trajectories for the one or more vehicles over the period of time based on the control policies and the initial locations of the one or more vehicles. Additionally, the functions comprise determining one or more estimated distributions of vehicles in the fleet of vehicles at respective phases within the period of time based on the determined trajectories for the one or more vehicles. Further, the functions comprise determining a score associated with the determined control polices based on a comparison between the one or more estimated distributions and corresponding desired distributions of the sequence of coverage requirements.

In still another example, a system is provided that comprises at least one processor, and data storage comprising program instructions executable by the at least one processor to cause the system to perform functions. The functions comprise receiving a sequence of coverage requirements for a region and an associated period of time. The region may be divided into a plurality of cells, and an individual coverage requirement may indicate a desired distribution of vehicles among the plurality of cells at a given phase within the period of time. The functions also comprise receiving an initial location of one or more vehicles of a fleet of vehicles, and determining a control policy for each of the one or more vehicles for the period of time. An individual control policy may comprise information indicative of a direction of travel for a vehicle for respective cells of the plurality of cells. The functions further comprise determining trajectories for the one or more vehicles over the period of time based on the control policies and the initial locations of the one or more vehicles. Additionally, the functions comprise determining one or more estimated distributions of vehicles in the fleet of vehicles at respective phases within the period of time based on the determined trajectories for the one or more vehicles. Further, the functions comprise determining a score associated with the determined control polices based on a comparison between the one or more estimated distributions and corresponding desired distributions of the sequence of coverage requirements.

These as well as other aspects, advantages, and alternatives, will become apparent to those of ordinary skill in the art by reading the following detailed description, with reference where appropriate to the accompanying figures.

DETAILED DESCRIPTION

Figure 1:
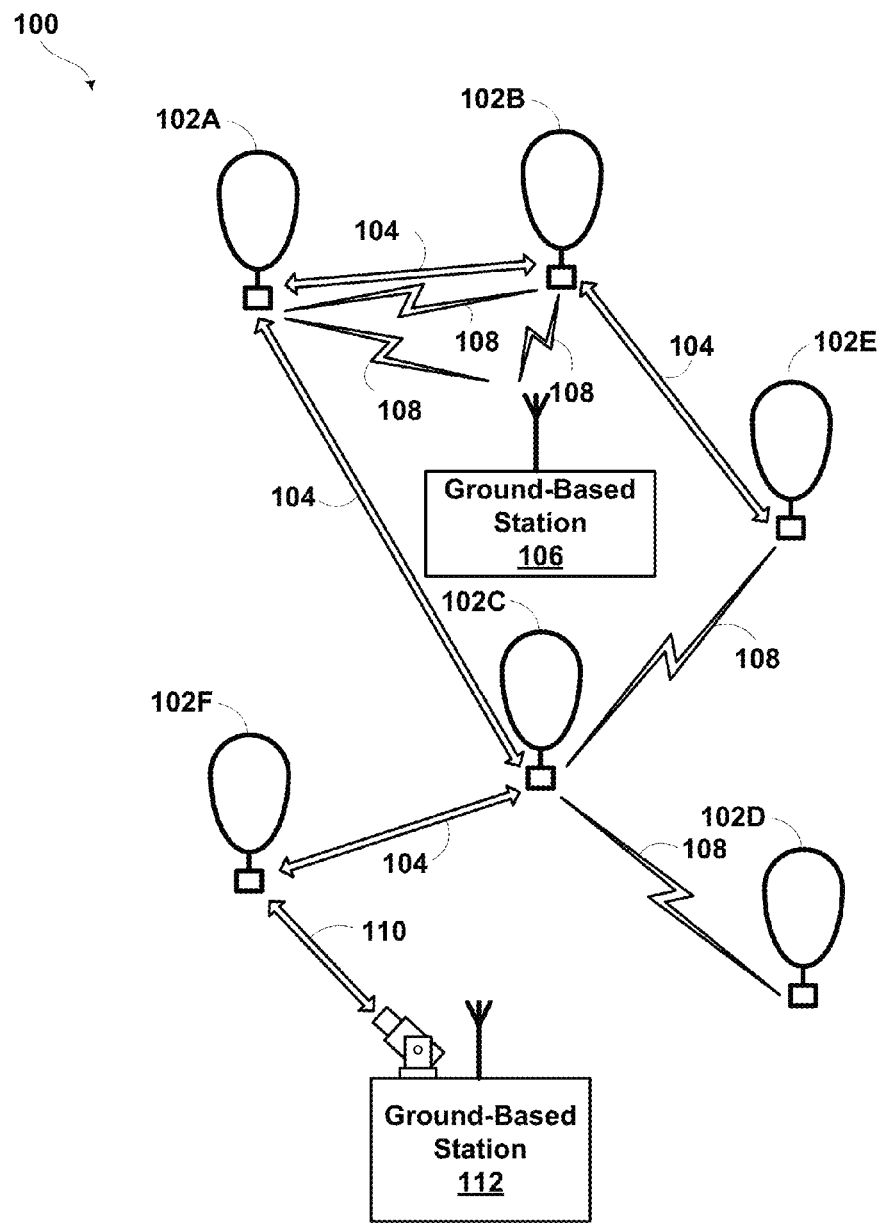
FIG. 1 is a block diagram illustrating an example balloon network.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Examples herein may be configured to provide control of vehicles within a fleet of vehicles. The vehicles may be any number of types of vehicles including, for example, autonomous or semi-autonomous vehicles, such as aerial vehicles, boats, underwater vehicles, satellites, aerostats, etc. for mapping/surveying, sensing, providing connectivity, etc. In other examples, methods described herein may be used to control or dispatch autonomous cars to maintain a well-distributed fleet of autonomous taxis in a city to support rapid dispatch of taxis. The vehicles may be any type of mobile object, element, platform, etc.

In still further examples, vehicles may be or include elements of a data network that includes a plurality of balloons, for example, configured as a mesh network formed by high-altitude balloons deployed in the stratosphere. Since winds in the stratosphere may affect locations of the balloons in a differential manner, each balloon in an example network may be configured to change its horizontal position by adjusting its vertical position (i.e., altitude). For example, by adjusting its altitude, a balloon may be able find winds that will carry the balloon horizontally (e.g., latitudinally and/or longitudinally) to a desired horizontal location. In other examples, each balloon may be configured to change its horizontal position using propellers or other mechanisms to generate horizontal thrust rather than or in addition to adjusting its horizontal position by adjusting its vertical position.

Within examples, methods and systems are described with respect to elements of a fleet of vehicles being balloons in a fleet of balloons arranged as a data network. However, as mentioned above, methods and systems herein may be applicable to other types of vehicles of a fleet of vehicles, and thus, the examples described are not limiting.

When managing a fleet of autonomous balloons, a fleet administrator or computer may determine a sequence of coverage requirements for the fleet. The sequence of coverage requirements may specify desired amounts of balloon coverage for different parts of the world. For instance, the desired amounts of balloon coverage may include providing at least ten balloons in a first area, at least five balloons in a second area, and at least eighteen balloons in a third area at a first instance in time and then, at a second instance in time, providing at least five balloons in the first area, ten balloons in the second area, and twenty balloons in the third area. In one example, in order for a fleet of balloons to satisfy the coverage requirements, a fleet plan that stages balloons in particular places ahead of deadlines such that the balloons will be able to arrive at a desired location on time may be required. Therefore, to control the fleet of balloons, a simultaneous plan of trajectory for many balloons at many different starting locations is needed, and each balloon may take a different path.

Given the initial position of one or more balloons of a fleet of balloons and a sequence of coverage requirements, systems and methods for determining control policies for each balloon of the fleet that satisfy the sequence of requirements are provided. According to an example method, initial positions of each balloon of a fleet of balloons as well as a sequence of coverage requirements for a region may be received or determined. The region may be divided into a plurality of cells, and the coverage requirements may indicate desired distributions of balloons among the plurality of cells at various times within a planning period of time.

The method may also include determining a control policy for each balloon for the period of time. In one example, a control policy for a balloon may indicate actions the balloon may perform. An action to perform may be conditioned on other aspects of the balloon's configuration. For instance, a balloon's control policy might discretize the balloon's world into an x/y grid and specify a different action to be taken in each cell of that grid. As an example, a control policy for a balloon may include information indicative of a direction of travel for the balloon while the balloon is within a particular cell of the grid. In another instance, each control policy for each balloon may include information indicative of a direction of travel for the balloon during specific time periods. For example, a first balloon may fly at a first altitude for a first time period, a second altitude for a second time period, and a third altitude for a third time period, regardless of the location of the balloon within the region.

Based on the control policy for each balloon and the initial location of each balloon, an estimated distribution of the balloons at each of a plurality of phases within the period of time may be determined. For example, trajectories of each balloon within the region may be simulated, and based on the resulting trajectories, distributions of the balloons at different periods of time within the period of time may be determined. In one case, an estimated distribution may be found by dividing the region into a plurality of cells and determining the number of balloons within each cell at a given time period.

Additionally, a score associated with the determined control policies may be found. The score may be determined based on a comparison between the estimated distributions and corresponding desired distributions of the sequence of coverage requirements. For example, the score may quantify a number of balloons present at various locations within the region versus a number of desired balloons for the various locations throughout the period of time. Other quality metrics associated with the estimated distributions may also contribute to the determined score.

Stochastic optimization or other optimization methods (e.g., hill climbing) may also be used to explore the space of possible balloon control policies in an attempt to find the fleet-wide optimally scoring control policies or an approximation of the optimally scoring control policies for the fleet of balloons. For example, the control policies associated with the fleet of balloons may be iteratively and/or randomly revised to determine a global optimum of a score function that is used to determine the score.

Referring now to the Figures, FIG. 1 is a block diagram illustrating an example balloon network 100. As shown, the balloon network 100 includes balloons 102A to 102F, which are configured to communicate with one another via free-space optical links 104 and/or RF links 108. Configured as such, balloons 102A to 102F may collectively function as a mesh network for packet-data communications. Further, at least some of balloons 102A and 102B may be configured for RF communications with ground-based stations 106 via respective RF links 108. Yet further, some balloons, such as balloon 102F, may be configured to communicate via optical link 110 with ground-based station 112.

In an exemplary embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an exemplary embodiment, high-altitude balloons may be generally configured to operate in an altitude range within the stratosphere that has a wide range of wind speeds. For instance, between 17 km and 20 km altitude above the surface, the average wind speed may be between about 30 mph to about 35 mph, while the max wind speed may be up to 200 mph. As another example, at about 26 km altitude above the surface, the average wind speed may be between about 60 mph to about 65 mph, while the max wind speed may exceed 300 mph.

More specifically, in a high-altitude-balloon network, balloons 102A to 102F may generally be configured to operate at altitudes between 18 km and 25 km (although other altitudes are possible). At such altitudes, the winds between 18 km and 25 km may vary with latitude and by season, and the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an exemplary embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers.

In a further aspect, balloons 102A to 102F may utilize one or more of various different RF air-interface protocols for communication with ground-based stations 106 via respective RF links 108. For instance, some or all of balloons 102A to 102F may be configured to communicate with ground-based station 106 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect in balloon network 100, balloon 102F is configured as a downlink balloon to provide a high-capacity air-ground link. Like other balloons in an exemplary network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and ground-based station 112.

Note that in some implementations, a downlink balloon 102F may additionally be operable for RF communication with ground-based station 106. In other cases, a downlink balloon 102F may only use an optical link for balloon-to-ground communications. Further, while the arrangement shown in FIG. 1 includes just one downlink balloon 102F, an exemplary balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104.

Ground-based stations, such as ground-based station 106 and/or 112, may include components such as transceivers, transmitters, and/or receivers for communication via RF links and/or optical links with a balloon network. Further, a ground-based station may use various air-interface protocols in order to communicate with a balloon 102A to 102F over an RF link. As such, a ground-based station 106 may be configured as an access point via which various devices can connect to balloon network 100.

In a further aspect, some or all balloons 102A to 102F could be configured to establish a communication link with space-based satellites in addition to, or as an alternative to, a ground-based communication link. In some embodiments, a balloon may communicate with a satellite via an optical link.

Further, some ground-based stations, such as ground-based station 106, may be configured as gateways between balloon network 100 and one or more other networks. Such a ground-based station 106 may thus serve as an interface between the balloon network and the Internet, a cellular service provider's network, and/or other types of networks.

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to the balloon and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an exemplary balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. For instance, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, the same wavelength can be assigned for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

In some examples, a balloon network 100 may have a non-uniform topology. For instance, exemplary embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be more dense over land than over large bodies of water. Many other examples of non-uniform topologies are possible.

Figure 2:
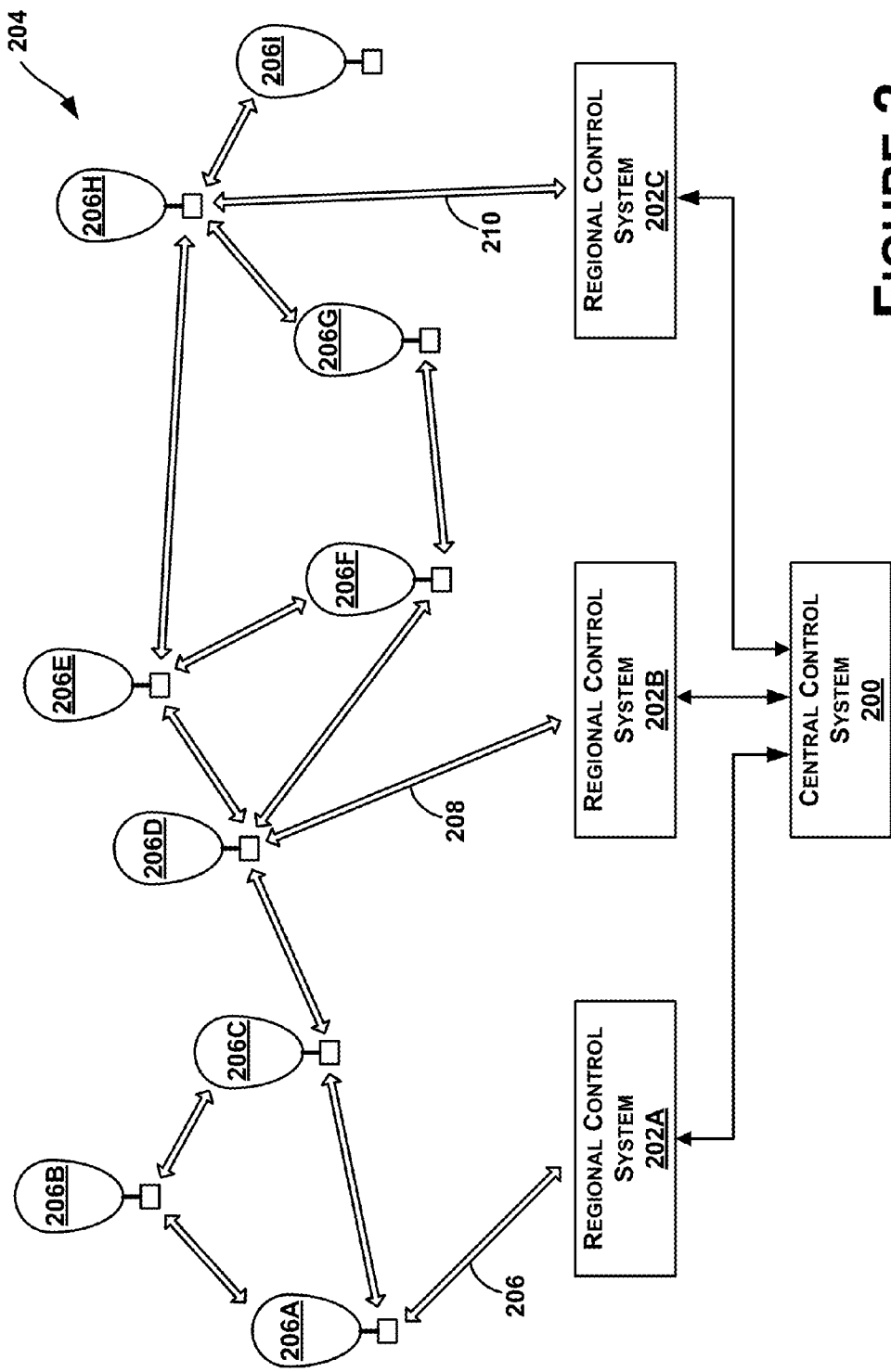
FIG. 2 is a block diagram illustrating an example balloon-network control system.

FIG. 2 is a block diagram illustrating an example balloon-network control system. In particular, FIG. 2 shows a distributed control system, which includes a central control system 200 and a number of regional control-systems 202A to 202C. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that the balloons cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 204A, 204D, and 204H are configured as downlink balloons. As such, regional control systems 202A to 202C may respectively communicate with balloons 204A, 204D, and 204H via optical links 206, 208, and 210, respectively.

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in the balloon network and/or the wavelength availability on the links. This topology may then be sent to some or all of the balloons so that a routing technique may be employed to select appropriate lightpaths (and possibly backup lightpaths) for communications through the balloon network 204.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Figure 3:
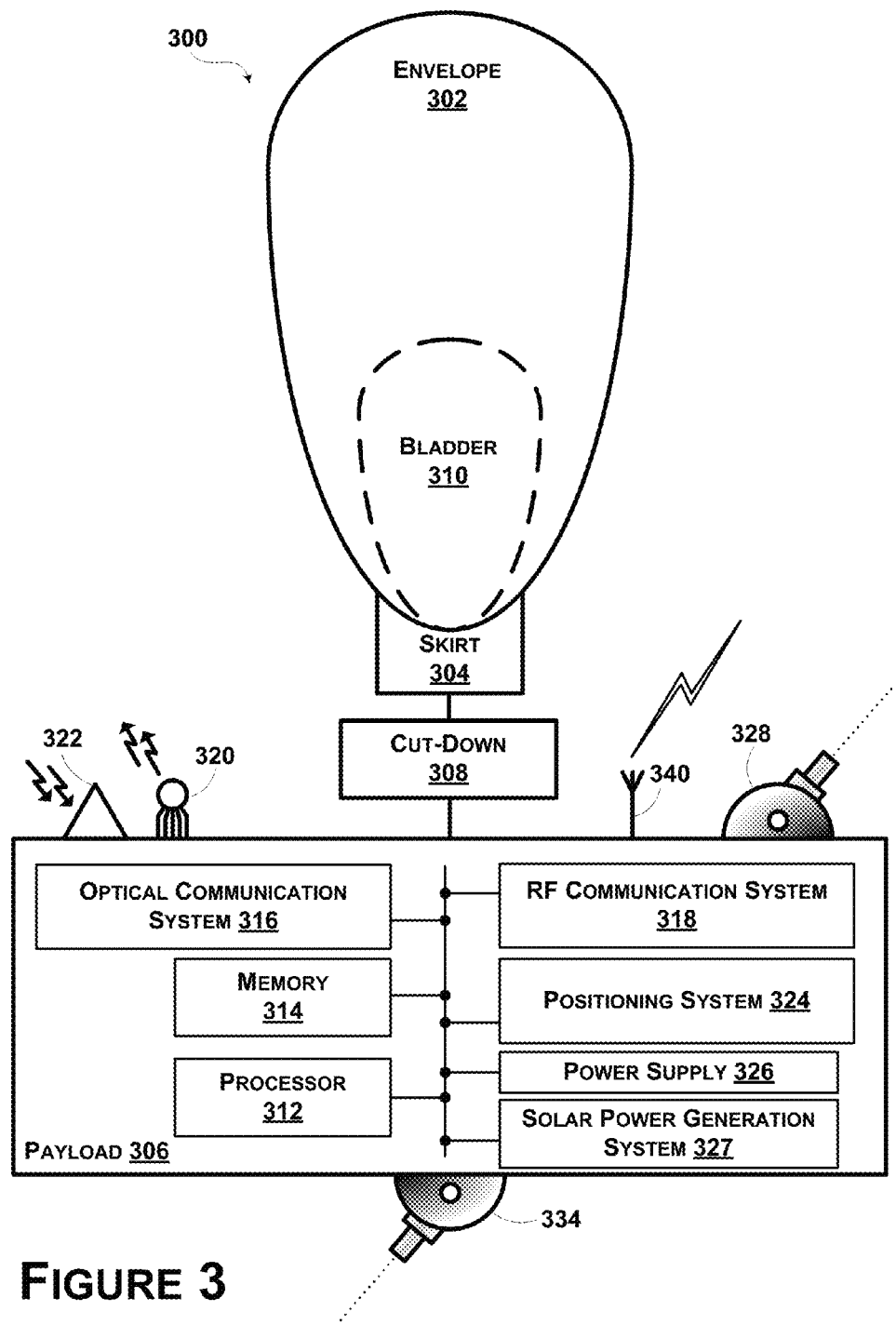
FIG. 3 shows a high-altitude balloon according to an example embodiment.

Various types of balloon systems may be incorporated in an exemplary balloon network. As noted above, an exemplary embodiment may utilize high-altitude balloons, which typically operate in an altitude range between 18 km and 25 km. FIG. 3 shows a high-altitude balloon 300, according to an exemplary embodiment. As shown, the balloon 300 includes an envelope 302, a skirt 304, a payload 306, and a cut-down system 308 that is attached between the balloon 302 and payload 306.

The envelope 302 and skirt 304 may take various forms, for instance, the envelope 302 and/or skirt 304 may be made of metalized Mylar or BoPet. Alternatively or additionally, some or all of the envelope 302 and/or skirt 304 may be constructed from a highly-flexible latex material or a rubber material such as chloroprene. Further, the shape and size of the envelope 302 and skirt 304 may vary depending upon the particular implementation. Additionally, the envelope 302 may be filled with various different types of gases, such as helium and/or hydrogen.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photo-diode receiver system). Further, payload 306 may include an RF communication system 318, which may transmit and/or receive RF communications via an antenna system 340. The payload may further include a positioning system 324 that can include a GPS or other location-based sensors.

The payload 306 may also include a power supply 326 to supply power to the various components of balloon 300. The power supply 326 may include or take the form of a rechargeable battery. In addition, the balloon 300 may include a solar power generation system 327. The solar power generation system 327 may include solar panels and could be used to generate power that charges and/or is distributed by the power supply 326.

Further, payload 306 may include various types of other systems 328 and sensors 334. For example, payload 306 may include one or more video and/or still cameras, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, various contemplated embodiments, altitude control of balloon 300 could be achieved, at least in part, by adjusting the rotation of the balloon with respect to the sun.

Further, the balloon 300 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location.

Alternatively, the altitudinal adjustments may be computed by a ground-based control system and communicated to the high-altitude balloon. As another alternative, the altitudinal adjustments may be computed by a ground-based or satellite-based control system and communicated to the high-altitude balloon. Furthermore, in some embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an exemplary embodiment, the cut-down system 308 may include a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302. Other types of cut-down systems and/or variations on the illustrated cut-down system 308 are possible as well.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground. In yet other embodiments, balloons may be serviced in-flight by specific service balloons or another type of service aerostat or service aircraft.

As described, movement and locations of balloons can vary since winds in the stratosphere may affect the locations of the balloons in a differential manner. A balloon in an example network may be configured to change its horizontal position by adjusting its vertical position (i.e., altitude). For example, by adjusting its altitude, a balloon may be able to find winds that will carry the balloon horizontally (e.g., latitudinally and/or longitudinally) to a desired horizontal location. Wind speed and/or direction may vary with altitude, and since current wind velocities as well as weather forecasts are available, in principle, a balloon may be directed to a location by identifying an altitude at which a wind direction takes a balloon along a desired trajectory. However, a balloon without other forms of propulsion may be constrained to follow the wind and there may not be a single altitude with winds taking the balloon along the desired trajectory. In addition, to control a fleet of balloons, movement of the balloons should occur from one location above the surface of the Earth to another in a predictable manner.

In some examples, determining a fleetplan for a fleet of balloons may require staging balloons of the fleet into places ahead of time such that the balloons will be able to arrive at a landmark on time. For instance, a balloon may need to follow a trajectory that does not contribute usefully to goals during a first phase and a second phase such that the balloon can reach a desired landmark at the end of a third phase. This kind of staging may be useful when goal landmarks are spread non-uniformly throughout a fleet's coverage area. For example, there may be large regions (e.g., relative to a balloon's maximum range during a phase) requiring few or no balloons, but which may need to be traversed in order to satisfy a goal number of balloons for other regions. Such situations arise naturally, for example, when goal distributions are proportional to population density: there are a limited number of people in the oceans, few people on many parts of land, and many people in major cities.

Figure 4:
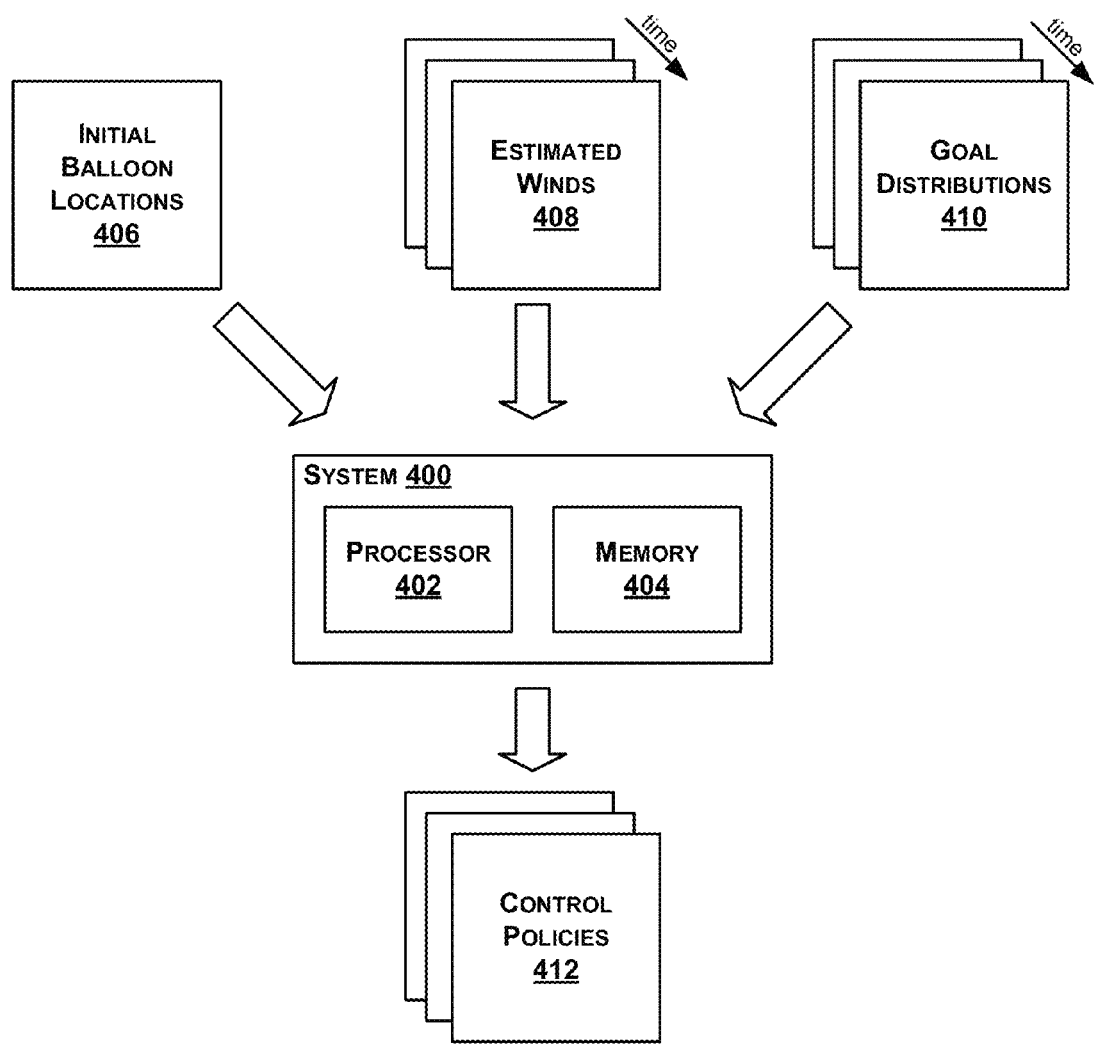
FIG. 4 illustrates an example system for determining fleet control policies.

FIG. 4 illustrates an example system 400 for determining fleet control policies. The system 400 may include a processor 402 and a memory 404. The processor 402 may be any type of processor, such as a microprocessor, digital signal processor (DSP), multicore processor, etc., coupled to the memory 404. The memory may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis. In some instances, the system 400 may include multiple processors and/or memories.

In one example, the memory 404 may store instructions that are executable by the processor 402 to cause the system 400 to determine fleet control policies. For instance, the system 400 may receive initial balloon locations 406, estimated winds 408, and goal distributions 410, and determine control policies 412 for a fleet of balloons based on the received information.

The initial balloon locations 406 may include the initial location of each balloon of the fleet of balloons. In one example, each balloon may include a GPS or other location-based sensor. Based on information received from the location-based sensor a location of each balloon may be determined. For instance, each balloon may periodically provide its location to the system 400. As an example, the initial location of a balloon may be specified in terms of a latitude, longitude, and altitude.

The estimated winds 408 may include information about predicted or known wind velocities for a region. In one example, the region 400 may be divided into a plurality of cells and the estimated winds 408 may include information identifying the estimated wind velocity for each cell at one or more altitudes. For instance, the estimated wind velocity for a given cell at a first altitude may be different than the estimated wind velocity for a given cell at a second altitude. Optionally, the estimated winds 408 may vary over time. For example, the estimated winds 408 may include separate wind velocities for various times within a planning period of time.

In one example, the estimated winds 408 may be determined based on wind data received from one or more balloons of the fleet. In other examples, the wind data may be determined based on wind data received from the National Oceanic and Atmospheric Administration (NOAA), or based on other historical averages of wind speeds and directions.

The goal distributions 410 may specify a sequence of coverage requirements for a region of interest (e.g., the entire Earth or a portion of the Earth) and an associated period of time. As an example, the region may be divided into a plurality of cells and each individual coverage requirement of the sequence of coverage requirements may indicate a desired distribution of balloons among the plurality of cells at a given phase within the period of time. For instance, an individual coverage requirement may indicate a desired number of balloons to be present within each cell at a particular time.

The goal distributions may be uniform and/or non-uniform distributions. According to one implementation, the goal distributions 410 may include an array of latitude/longitude/time cells and each cell of the array may indicate a desired number of balloons. In some instances, the goal distributions 410 may vary over time. In other instances, the goal distributions 410 may be constant over time.

The system 400 may be configured to generate the control policies 412 for the balloons. The control policies 412 may include a control policy for each balloon of the fleet of balloons. A control policy for a balloon may indicate actions the balloon may perform. For example, the control policy for a balloon may indicate a direction of travel for the balloon while the balloon is within a particular cell of the plurality of cells. As an example, the control policy may specify an altitude to fly at within the particular cell. The altitude may correspond to a direction of travel (e.g., a velocity vector) based on the estimated winds for the particular cell. In some instances, the plurality of cells over which the goal distributions 410 are described may be further divided into a finer resolution grid of cells for which the control policies 412 are specified. Within each cell, the system 400 may randomly determine a direction of travel from among the possible directions of travel. Note that the directions of travel may be constrained by the estimated winds 408.

In some instances, an individual control policy for a balloon may vary over time. In other instances, the control policy for the individual balloon may remain constant over time. In some examples, each balloon may have its own distinct control policy. In other examples, all balloons or one or more groups of balloons of the fleet of balloons may share a control policy.

In another example, the control policy for each balloon may not be dependent on the location of the balloon within the plurality of cells. For instance, there may just be a single spatial cell that covers the whole region. Each balloon may have its own control policy, and the control policy may change over time. As an example, a first balloon may fly at a first altitude for a first hour, a second altitude for a second hour, a third altitude for a third hour, etc. Similarly, control polices for other balloons may indicate a single direction of travel for the balloon during respective time periods of the period of time.

Stochastic optimization or other optimization methods (e.g., hill climbing) may also be used to explore the space of possible balloon control policies in an attempt to find the fleet-wide optimally scoring control policies for the fleet of balloons. For example, the control policies associated with the fleet of balloons may be iteratively and/or randomly revised to determine a global optimum of a score function that is used to numerically evaluate the control policies 412 against one or more quality metrics.

Figure 5:
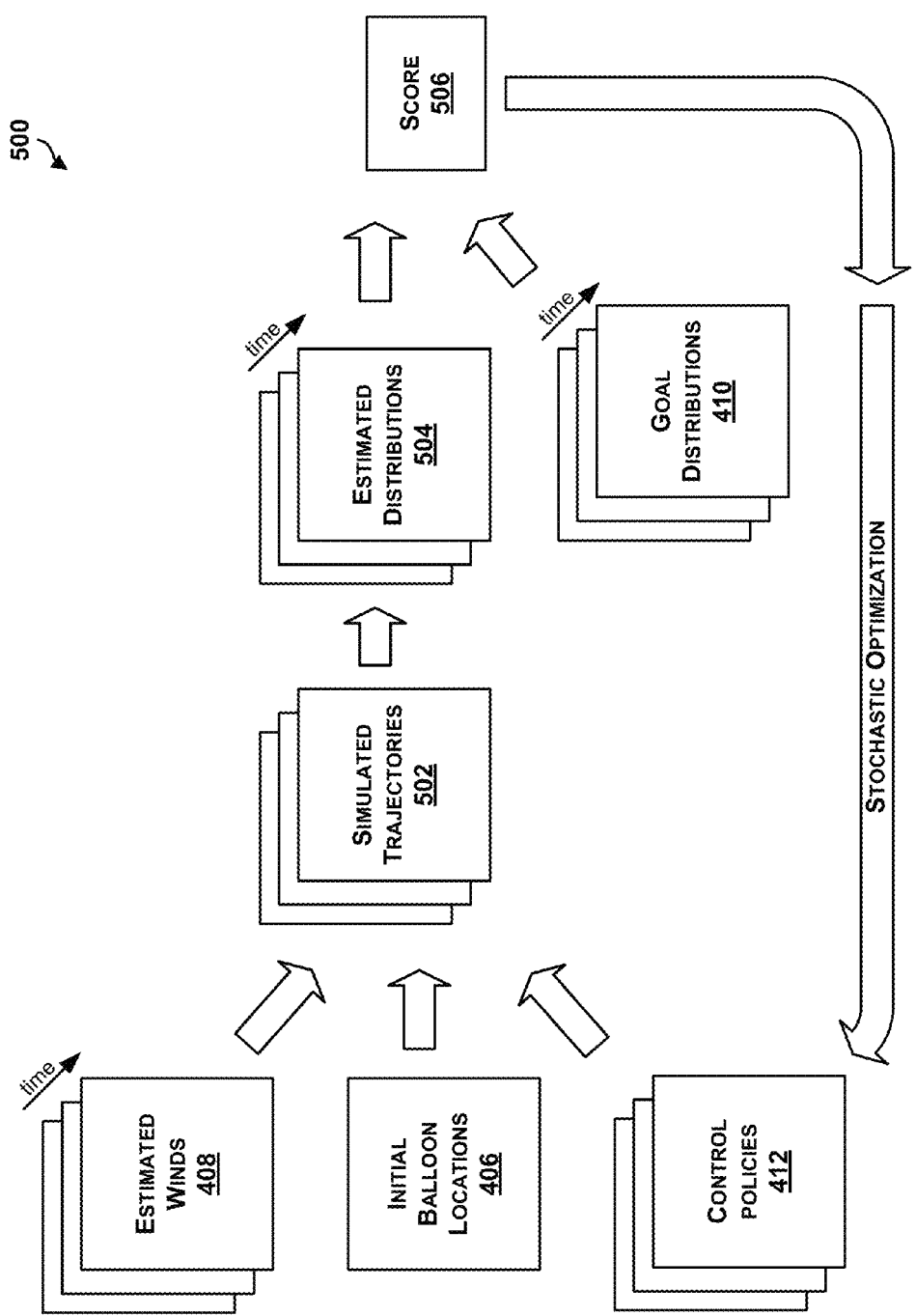
FIG. 5 illustrates an example method for revising fleet control policies.

FIG. 5 illustrates an example method 500 for revising fleet control policies. Based on the control policy for each balloon and the initial location of each balloon, an estimated distribution of the balloons at each of a plurality of phases within the period of time may be determined. For example, the system 400 may be configured to determine simulated trajectories 502 for each of the balloons based on one or more of the estimated winds 408, the initial balloon locations 406, and the control policies 412. Based on the simulated trajectories 502, estimated distributions 504 may be determined. The estimated distributions 504 may be found by analyzing distributions of the balloons at different periods of time. For instance, an estimated distribution may be found by determining the number of balloons within each cell of the plurality of cells at a given time period. In one example, an estimated distribution corresponding to each phase for which a goal distribution is specified may be determined.

Additionally, according to the method 500, a score 506 associated with the determined control policies 412 may be found. In one example, the score may be determined based on a comparison between the estimated distributions 504 and the goal distributions 410. For example, the score may quantify a number of balloons present at various locations within the region versus a number of desired balloons for the various locations throughout the period of time.

Additional quality metrics associated with the estimated distributions may also contribute to the determined score 506. In some instances, the determined score 506 may quantify the distribution of the fleet of balloons during the period of time (e.g., in between goal distributions and/or at the end of each of the plurality of phases). For example, the simulated trajectories 502 may be evaluated continuously over the period of time to evaluate additional characteristics of the fleet of balloons. As an example, one component of the score 506 may be proportional to the average separation between each balloon and a nearest neighbor balloon over the course of the trajectory. As another example, another component of the score 506 may be proportional to the average number of balloons within a threshold distance of the balloon over the course of a balloon's trajectory.

In other examples, the score 506 may also include a component that quantifies the amount of fuel consumed over the course of the trajectories of the fleet of balloons (e.g., the amount of fuel required to change altitudes to follow different winds). Other hybrid quality metrics associated with the simulated trajectories are also possible.

The control policies 412 may then be stochastically optimized to determine control policies that yield an optimal score. The optimal score may minimize a difference between the estimated distributions 504 and goal distributions 410. The optimal score may be a maximum or minimum score depending on whether a high value of the score 506 corresponds to a large difference between the estimated distributions 410 and goal distributions 410 or a small difference between the estimated distributions 504 and goal distributions 410. One approach to optimizing the control policies 412 might involve randomly selecting a control policy for a balloon and determining one or more alternative directions of travel for the balloon within a given cell. The simulated trajectories 502 and estimated distributions 504 may then be revaluated and a new score associated with each alternative direction of travel may be determined. In one scenario, the direction of travel that yields the greatest score may be selected to replace the previous direction of travel in the given cell for the control policy of the balloon. The process may be performed repeatedly until the score 506 ceases to improve. Additional details and examples of the method 500 are further described below with reference to FIGS. 6 through 10.

Figures 6, 7:
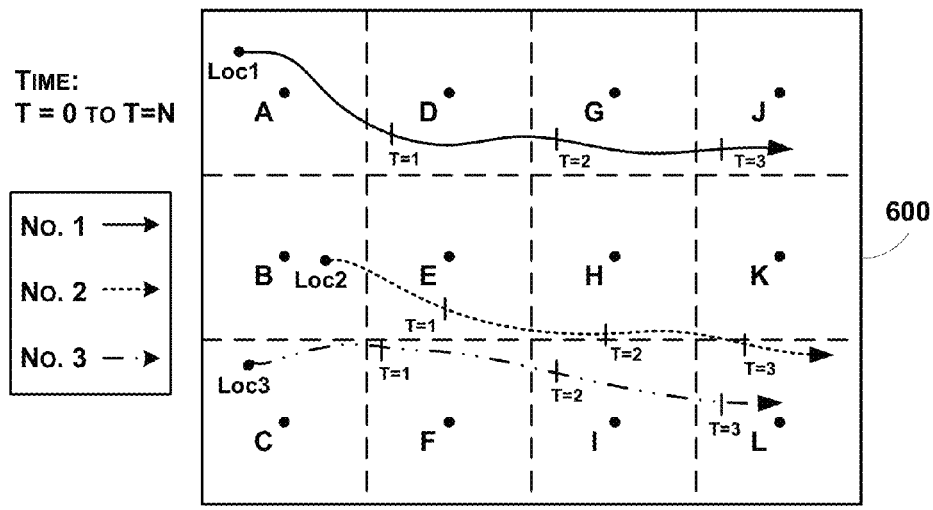
FIG. 6 illustrates example trajectories for a plurality of balloons.
FIG. 7 illustrates an example estimated distribution and example distribution statistics.

FIG. 6 illustrates example trajectories for a plurality of balloons. As shown in FIG. 6, trajectories for each of three balloons within a region 600 for a period of time T=0 to T=N are shown. The region 600 is divided into a plurality of cells A-L. Although the region 600 is shown as a rectangular grid, the example is not meant to be limiting. For each trajectory, the location of the corresponding balloon at T=1, T=2, and T=3 is noted. For example, a first balloon, whose trajectory is represented by the solid line, may initially be located within cell A at T=0, travel to cell D at T=1, cell G at T=2, and cell J at T=3. Similarly trajectories for a second balloon, represented by the dotted line, and a third balloon, represented by the dashed and dotted line, are shown.

Based on the simulated trajectories, estimated distributions of the three balloons may be found for various periods of time over the time T=0 to T=N. FIG. 7 illustrates an example estimated distribution 700 and example distribution statistics 702.

The example distribution 700 indicates the number of balloons within each cell of the region 600 at time T=1. For instance, based on the simulated trajectories shown in FIG. 6, at time T=1, one balloon is located in each of cells D, E, and F, while no balloons are located within the other cells of the region 600.

The example distribution statistics 702 for time T=1 are also shown in FIG. 7. As shown in FIG. 7, at time T=1, the nearest neighbor balloon (balloon No. 2) to the first balloon is located 49 km away from the first balloon and there is only one balloon within 50 km of the first balloon. For the second balloon, the distance to the nearest neighbor balloon (balloon No. 3) is 20 km and the number of balloons within 50 km is two. Similarly, for the third balloon, the distance to the nearest neighbor balloon is 20 km while the number of balloons within 50 km is one.

Figure 8:
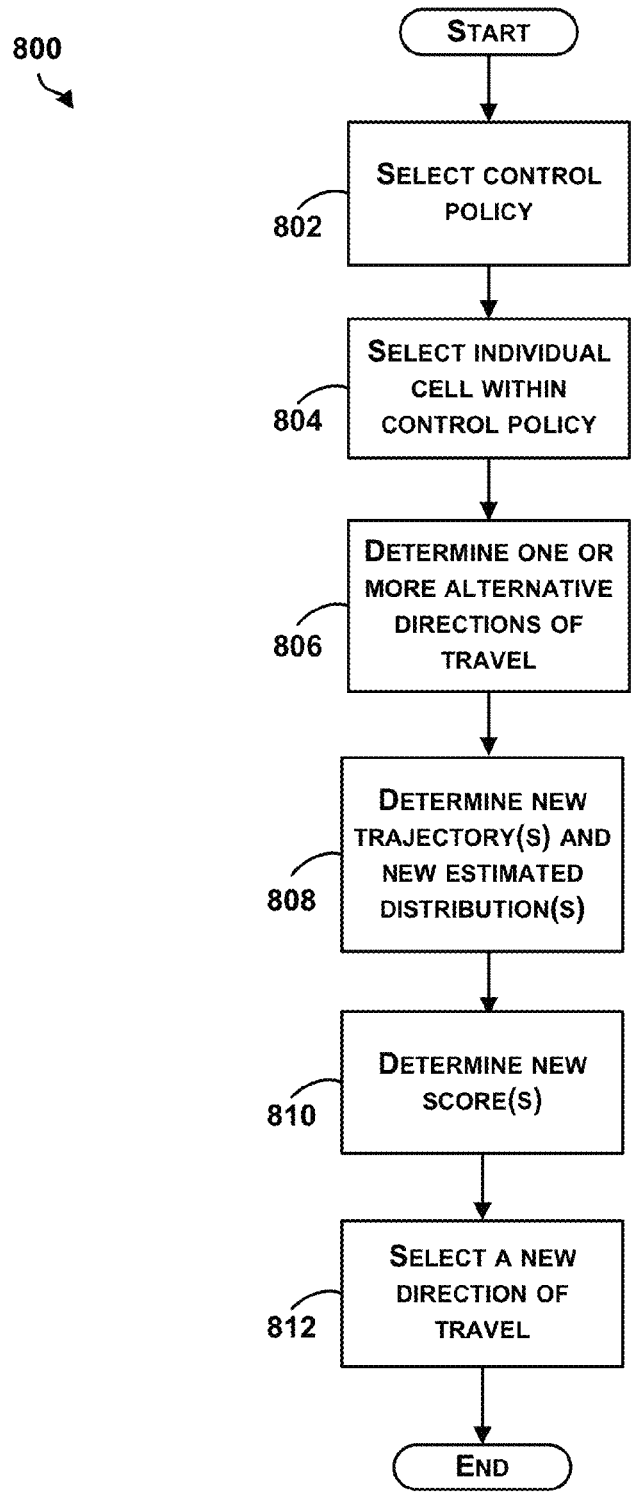
FIG. 8 illustrates an example method for revising a control policy.

FIG. 8 illustrates an example method 800 for revising a control policy. In some examples, the method 800 or portions of the method 800 may be part of an optimization technique that is used to revise the control policies for the fleet of balloons. Initially, at block 802, a control policy for a given balloon (or group of balloons) may be selected. At block 804, an individual cell within the selected control policy may be selected.

Subsequently, at block 806, one or more alternative directions of travel within the selected individual cell may be determined. For instance, the alternative directions of travel may be constrained by the viable directions that the balloon may travel within the individual cell according to the estimated wind velocities at one or more altitudes for the individual cell. At block 808, new trajectories and new estimated distributions corresponding to each of the one or more alternative directions may be determined. For instance, for each alternative direction of travel, an estimated trajectory for the balloon may be determined. Based on each of the estimated trajectories, corresponding estimated distributions may be determined.

At block 810, new scores associated with the alternative directions of travel may be found. For example, the new scores may be found by comparing the new determined estimated distributions to the goal distributions for the fleet of balloons. Based on the new determined scores, at block 812, a direction of travel for the individual cell may be selected. In one case, the direction of travel associated with the maximum score may be selected.

In an example, in which each control policy for each balloon includes a single direction of travel for the balloon to travel, regardless of the location of the balloon, which varies over time, revising the control policy for each balloon may further involve optimizing the length of each phase of the control policies as well. For example, a control policy for a first balloon may include information indicating to fly at a first altitude for a first duration of time D1, fly at a second altitude for a second duration of time D2, fly at a third altitude for a third duration of time D3, etc. Revising the control policy for each balloon may then involve exploring the possible pairs of altitudes and durations of time (D1, D2, D3, etc.) for each balloon to determine an optimal score that minimizes a difference between the estimated distributions and goal distributions for the fleet of balloons.

Figure 9A:
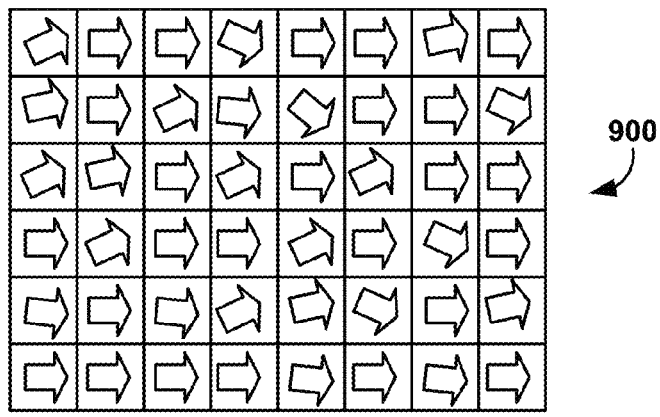
FIG. 9A is a conceptual illustration of an example control policy.

FIG. 9A is a conceptual illustration of an example control policy. As shown in FIG. 9A, a control policy for a given balloon or group of balloons may indicate a direction of travel for the balloon within each cell of a region 900. Note that in one example, the direction of travel may be associated with an altitude or mixture of altitudes that the balloon should reach to move in the direction of travel. In one example, the balloon may ascend/descend to a first altitude when the balloon enters a cell, follow winds at the first altitude for a period of time, and then ascend/descend to a second altitude to follow winds at a second altitude in order to have traveled in the direction of travel while the balloon is within the cell. In other examples, the balloon may maintain a constant altitude while in a given cell to travel in the direction of travel indicated by the control policy.

Figure 9B:
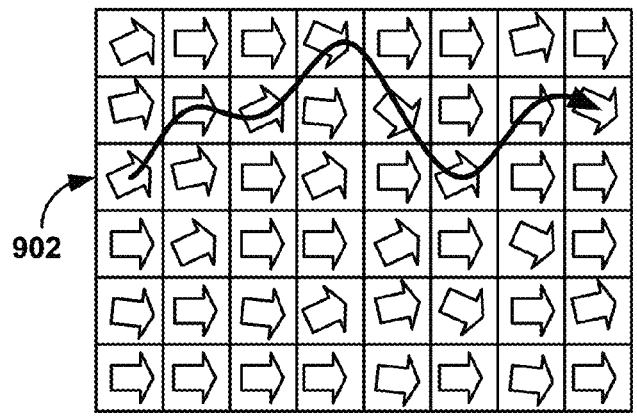
FIG. 9B is a conceptual illustration of an example simulated trajectory.

FIG. 9B is a conceptual illustration of an example simulated trajectory. For a balloon that is initially located in a cell 902, a trajectory for the balloon may be simulated based on the directions of travel indicated in the control policy. For instance, while the balloon is in the cell 902, the balloon may travel in a first direction at a first wind speed until the balloon enters a second cell. Upon entering the second cell, the balloon may travel in a second direction of travel at a second wind speed that is associated with the second cell. Traveling in the second direction of travel will then lead the balloon into a third cell where a new direction of travel is specified, and so on. Thus, by analyzing the initial location of the balloon, and calculating which cell the balloon will next enter based on the direction of travel and associated wind speeds, the trajectory of the balloon over time may be found.

Figure 9C:
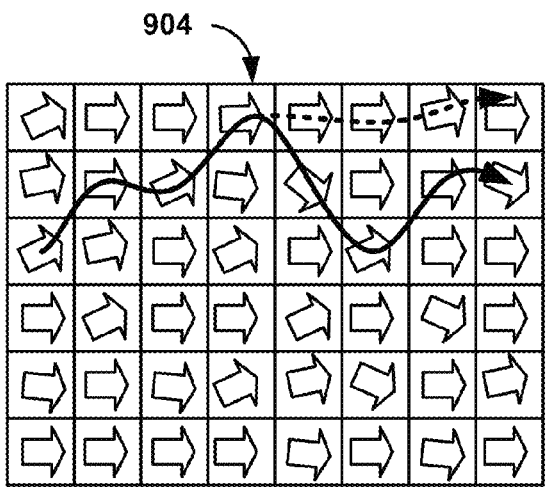
FIG. 9C is a conceptual illustration of an example of revising a control policy.

FIG. 9C is a conceptual illustration of an example of revising a control policy. In some instances, modifying the direction of travel that is specified by a control policy for an individual cell may alter the trajectory of the balloon. For instance, if the direction of travel for a balloon that is initially located in cell 902 is modified for a cell 904, the balloon's trajectory may be modified such that the balloon is guided to a different location by executing the control policy. For instance, modifying the direction of travel for the cell 904 of the control policy may cause the balloon to follow the trajectory represented by the dotted line in FIG. 9C.

Figure 10:
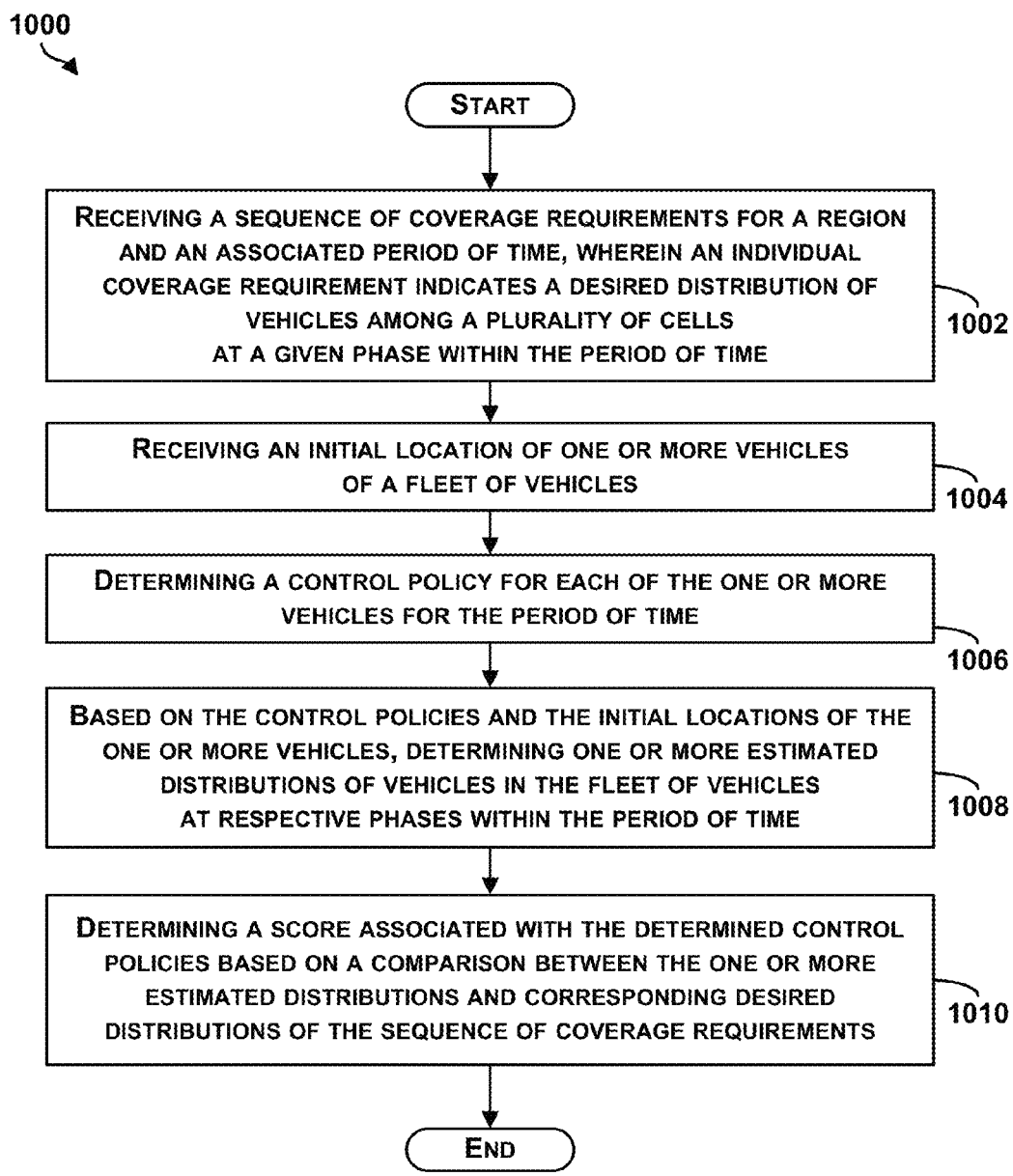
FIG. 10 is an example block diagram of a method to determine control policies for a fleet of vehicles, in accordance with at least some embodiments described herein.

FIG. 10 is an example block diagram of a method 1000 to determine trajectories for a fleet of vehicles, in accordance with at least some embodiments described herein. Method 1000 shown in FIG. 10 presents an embodiment of a method that, for example, could be used with the balloon networks 100 and 204, for example, and may be performed by a device, a server, a control station, a balloon, or a combination of any components of the balloon networks 100 and 204. Method 1000 may include one or more operations, functions, or actions as illustrated by one or more of blocks 1002-1010. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 1000 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 1000 and other processes and methods disclosed herein, each block in FIG. 10 may represent circuitry that is wired to perform the specific logical functions in the process.

At block 1002, the method 1000 includes receiving a sequence of coverage requirements for a region and an associated period of time. The region may be divided into a plurality of cells, and an individual coverage requirement may then specify a desired number of vehicles among the plurality of cells at a given phase within the period of time. Note that the number of vehicles may be a minimum number of vehicles that is desired for respective cells of the plurality of cells, and in some instances, it may be acceptable to have more than the minimum number of vehicles at each cell. Additionally, in some instances, the minimum number of vehicles may be zero for one or more cells and/or one or more phases. In one example, each coverage requirement may be determined based on population densities for different parts of the region or short-term coverage demands for one or more locations within the range.

At block 1004, the method 1000 includes receiving an initial location of one or more vehicles of a fleet of vehicles. In one example, each vehicle may include a GPS or other location-based sensor. Based on information received from the location-based sensor, a location of each vehicle may be determined. For instance, each vehicle may periodically send its location to a central control system or other node. Note that in some examples the location of each vehicle of the fleet may be received. In other examples, the location of only one or more of the vehicles may be received.

At block 1006, the method 1000 includes, determining a control policy for each of the one or more vehicles for the period of time. An individual control policy for a vehicle may include information indicative of a direction of travel for the vehicle for respective cells of the plurality of cells. To construct a control policy for each vehicle, a direction of travel may randomly be assigned to each cell of the plurality cells. In one example, the direction of travel may be the same for each cell. In other examples, the direction of travel may be different for one or more cells. In either example, the direction of travel may optionally vary over time. In an example in which vehicles of the fleet of vehicles include a balloon within a data network that is operable to provide data communication via optical or RF links, directions of travel within a given cell may be randomly selected from the available directions of travel that may be achieved based on the estimated winds at one or more altitudes for the cell. The control policy may then indicate a particular altitude to fly at, the particular altitude corresponding to a direction of travel.

At block 1008, the method 1000 includes, based on the control policies and the initial locations of the one or more vehicles, determining one or more estimated distributions of vehicles in the fleet of vehicles at respective phases within the period of time. In one example, the estimated distributions may be found by first determining a trajectory for each vehicle over the period of time, and then analyzing the positions of the vehicles along the respective trajectories at one or more time periods. In an example in which vehicles of the fleet of vehicles include a balloon within a data network, trajectories for the vehicles may be simulated based on the initial location of the vehicle and estimated winds that the vehicle would follow if the vehicle were executing the control policy. In one case, the estimated distribution may be the number of vehicles within each cell of the plurality of cells at a given time period.

At block 1010, the method 1000 includes determining a score associated with the determined control policies based on a comparison between the one or more estimated distributions and corresponding desired distributions of the sequence of coverage requirements. For instance, the score may be a numerical value that quantifies differences between estimated distributions and desired distributions at various phases. In one instance, a high and positive score value may be associated with a close agreement between the estimated distributions and desired distributions while a low score value may be associated with a large discrepancy between the estimated distributions and desired distributions. For instance, if the desired number of vehicles for many of the cells is under-satisfied according to the estimated distributions for the vehicles, the score may be lower than if all of the desired numbers of vehicles were satisfied by the estimated distributions of vehicles.

In some examples, the method 1000 may further include revising the control policies for the one or more vehicles using an optimization technique to determine an optimal score that minimizes a difference between the estimated distributions and the corresponding desired distributions.

In some examples, the method 1000 may also include instructing each of the one or more vehicles to execute the determined control policy for each vehicle. In an example in which vehicles of the fleet of vehicles include a balloon within a data network, each balloon may be provided with instructions that specify specific altitudes to fly at for various locations within the region. In other examples, an instruction can be sent to each balloon to indicate to change an altitude, and the instruction may be sent when the altitude change is needed.

In some examples, the method 1000 or portions of the method 1000 may be performed by a ground-based station (e.g., the ground-based station 102 in FIG. 1) or a central system (e.g., the central control system 200 in FIG. 2), and instructions can be provided to individual vehicles. In other examples, the method 1000 or portions of the method 1000 may be performed by the vehicles themselves, or by processors or computing devices residing on the vehicle, for example. The vehicles may receive any necessary information for performing the method 1000 from a server or ground-base station or from other vehicles. In further examples, the method 1000 may be performed by a combination of the vehicles and by ground-based stations, and each may be in communication so as to perform functions of the method 1000.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    receiving a sequence of individual coverage requirements for a region and an associated period of time, wherein the region is divided into a plurality of cells, and wherein each individual coverage requirement of the sequence of individual coverage requirements indicates a desired distribution of vehicles of a fleet of vehicles among the plurality of cells at a given phase within the period of time;
    receiving an initial location of one or more vehicles of the fleet of vehicles;
    determining, by a processor, a control policy for each of the one or more vehicles for the period of time, wherein the control policy comprises, for each of multiple respective cells of the plurality of cells, information indicative of a corresponding direction for the vehicle to travel while the vehicle is located in the cell;
    based on the control policies and the initial locations of the one or more vehicles, determining, by the processor, one or more estimated distributions of vehicles in the fleet of vehicles at respective phases within the period of time;
    determining, by the processor, a score associated with the determined control policies based on a comparison between the one or more estimated distributions and corresponding desired distributions of the sequence of individual coverage requirements, wherein the score quantifies a difference between the one or more estimated distributions and the corresponding desired distributions of the sequence of individual coverage requirements;
    revising, by the processor, at least one of the determined control policies to obtain a revised set of control policies that reduces the score; and
    instructing the one or more vehicles of the fleet of vehicles to execute the revised set of control policies.

2. The method of claim 1, wherein revising at least one of the determined control policies comprises revising, by the processor, the determined control policies using an optimization technique to determine an optimal score that minimizes the difference between the one or more estimated distributions and the corresponding desired distributions of the sequence of individual coverage requirements.

3. The method of claim 2, wherein the optimization technique comprises a stochastic optimization technique.

4. The method of claim 2, wherein revising the control policy for a given vehicle using an optimization technique to determine an optimal score comprises:
    determining one or more alternative directions of travel within an individual cell of a control policy associated with the given vehicle;
    for each of the one or more alternative directions of travel, determining a set of estimated distributions of the fleet of vehicles;
    determining a score associated with each set of estimated distributions; and
    revising the control policy for the given vehicle based on the score associated with each set of estimated distributions.

5. The method of claim 1, wherein determining one or more estimated distributions of the fleet of vehicles at respective phases within the period of time comprises:
    determining, for each of the one or more vehicles, a trajectory for the vehicle over the period of time given the initial location of the vehicle and the control policy for the vehicle; and
    based on the determined trajectories for the one or more vehicles, determining an estimated distribution of the fleet of vehicles among the plurality of cells at the respective phases.

6. The method of claim 5, further comprising:
    determining the score associated with the determined control policies based on an estimated amount of fuel consumed by the one or more vehicles executing the determined control policies.

7. The method of claim 1, wherein the control policies for the one or more vehicles vary over time.

8. The method of claim 7, wherein the information indicative of the direction for the vehicle to travel is indicative of a same direction of travel for each cell of the plurality of cells during a given time period.

9. The method of claim 1, further comprising determining the score associated with the determined control policies based on an amount of separation between the one or more vehicles during the period of time.

10. The method of claim 1, further comprising determining the score associated with the determined control policies based on a number of neighboring vehicles within a predetermined distance of each vehicle during the period of time.

11. The method of claim 1, wherein vehicles of the fleet of vehicles include a balloon within a data network that is operable to provide data communication via optical or radio-frequency (RF) links.

12. The method of claim 11, wherein a direction of travel within a given cell is constrained by estimated winds at one or more altitudes for the cell.

13. A non-transitory computer-readable storage medium having stored therein instructions, that when executed by a computing device, cause the computing device to perform functions comprising:

receiving a sequence of individual coverage requirements for a region and an associated period of time, wherein the region is divided into a plurality of cells, and wherein each individual coverage requirement of the sequence of coverage requirements indicates a desired distribution of vehicles of a fleet of vehicles among the plurality of cells at a given phase within the period of time;

receiving an initial location of one or more vehicles of the fleet of vehicles;

determining a control policy for each of the one or more vehicles for the period of time, wherein the control policy comprises, for each of multiple respective cells of the plurality of cells, information indicative of a direction for the vehicle to travel while the vehicle is located in the cell;

based on the control policies and the initial locations of the one or more vehicles, determining one or more estimated distributions of vehicles in the fleet of vehicles at respective phases within the period of time;

determining a score associated with the determined control policies based on a comparison between the one or more estimated distributions and corresponding desired distributions of the sequence of individual coverage requirements, wherein the score quantifies a difference between the one or more estimated distributions and the corresponding desired distributions of the sequence of individual coverage requirements;

revising at least one of the determined control policies to obtain a revised set of control policies that reduces the score; and instructing the one or more vehicles of the fleet of vehicles to execute the revised set of control policies.

14. The non-transitory computer-readable storage medium of claim 13, wherein revising at least one of the determined control polices comprises revising the determined control policies using an optimization technique to determine an optimal score that minimizes the difference between the one or more estimated distributions and the corresponding desired distributions of the sequence of individual coverage requirements.

15. The non-transitory computer-readable storage medium of claim 14, wherein revising the control policy for a given vehicle using an optimization technique to determine an optimal score comprises:

determining one or more alternative directions of travel within an individual cell of a control policy associated with the given vehicle;

for each of the one or more alternative directions of travel, determining a set of estimated distributions of the fleet of vehicles;

determining a score associated with each set of estimated distributions; and revising the control policy for the given vehicle based on the score associated with each set of estimated distributions.

16. The non-transitory computer-readable storage medium of claim 13, wherein vehicles of the fleet of vehicles include a balloon within a data network that is operable to provide data communication via optical or radio-frequency (RF) links.

17. A system, comprising:

at least one processor; and data storage comprising program instructions executable by the at least one process to cause the system to perform functions comprising:

receiving a sequence of individual coverage requirements for a region and an associated period of time, wherein the region is divided into a plurality of cells, and wherein each individual coverage requirement indicates a desired distribution of vehicles of a fleet of vehicles among the plurality of cells at a given phase within the period of time;

receiving an initial location of one or more vehicles of the fleet of vehicles;

determining a control policy for each of the one or more vehicles for the period of time, wherein the control policy comprises, for each of multiple respective cells of the plurality of cells, information indicative of a direction for the vehicle to travel while the vehicle is located in the cell;

based on the control policies and the initial locations of the one or more vehicles, determining one or more estimated distributions of vehicles in the fleet of vehicles at respective phases within the period of time;

determining a score associated with the determined control policies based on a comparison between the one or more estimated distributions and corresponding desired distributions of the sequence of individual coverage requirements, wherein the score quantifies a difference between the one or more estimated distributions and the corresponding desired distributions of the sequence of individual coverage requirements;

revising at least one of the determined control policies to obtain a revised set of control policies that reduces the score; and instructing the one or more vehicles of the fleet of vehicles to execute the revised set of control policies.

18. The system of claim 17, wherein revising at least one of the determined control policies comprises revising the determined control policies for the one or more vehicles to determine an optimal score that minimizes the difference between the one or more estimated distributions and the corresponding desired distributions of the sequence of individual coverage requirements by:

determining one or more alternative directions of travel within an individual cell of a control policy associated with a given vehicle;

for each of the one or more alternative directions of travel, determining a set of estimated distributions of the fleet of vehicles;

determining a score associated with each set of estimated distributions; and revising the control policy for the given vehicle based on the score associated with each set of estimated distributions.

* * * * *